Oct. 9, 1951 T. M. GLUYAS, JR 2,570,789

MODULATOR

Filed June 27, 1947 2 Sheets-Sheet 1

INVENTOR.
Thomas M. Gluyas, Jr.
BY Darry Tunick
ATTORNEY

Oct. 9, 1951 T. M. GLUYAS, JR 2,570,789

MODULATOR

Filed June 27, 1947 2 Sheets-Sheet 2

INVENTOR.
Thomas M. Gluyas, Jr.
BY Harry Tunick
ATTORNEY

Patented Oct. 9, 1951 2,570,789

UNITED STATES PATENT OFFICE 2,570,789

MODULATOR

Thomas M. Gluyas, Jr., Collingswood, N. J., assignor to Radio Corporation of America, a corporation of Delaware Application June 27, 1947, Serial No. 757,637

4 Claims. (Cl. 332—60)

Figures 1, 2, 2A, 3:
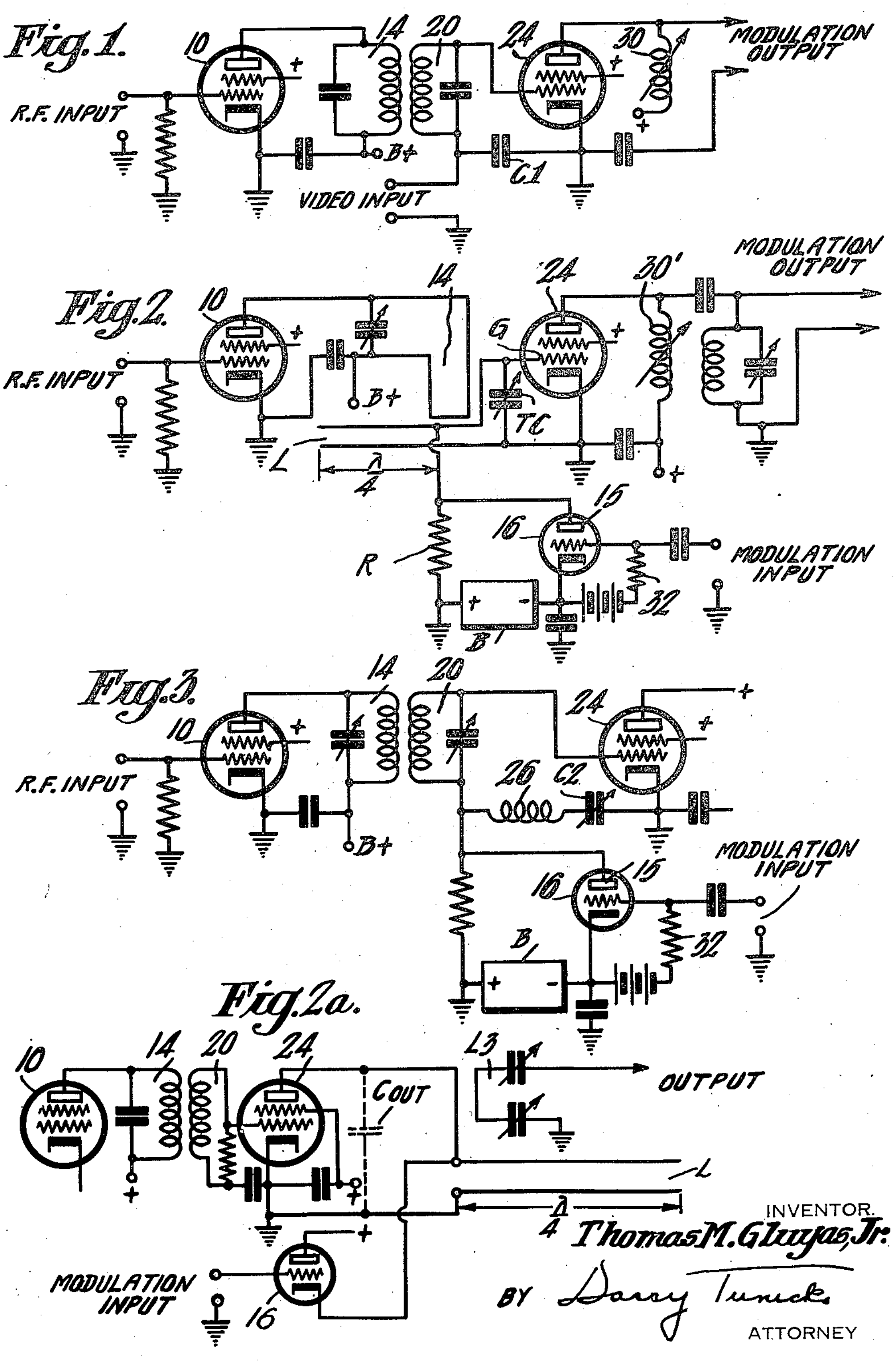

In this application, I disclose an improved modulator which is of use in the radio and allied arts. In the modulator of my invention, the grid of an R. F. stage is modulated and the arrangement is such that the modulation is linear for an extremely wide range of modulation frequencies. This makes my invention of particular value in the television art where the video band covers a wide range of frequencies.

Heretofore, in general, push-pull modulation stages have been used where a carrier is to be modulated by video signals. In these arrangements, the modulation is applied to a tap at the electrical center of a radio frequency grid coil in the push-pull radio frequency amplifier being modulated. The modulator tube output is as a consequence shunted by the grid to cathode capacity of both the radio frequency tubes and also by the capacity of the tank circuit to ground. This loading of the modulator output narrows the characteristic curve of the modulator and limits the frequency range through which linear modulation of the radio frequency stages can be carried out.

It is obviously of advantage to be able to use single ended radio frequency stages wherein the modulation is carried out. This is not easy, however, because the single ended systems must use an R. F. by-pass condenser across the modulator output to shunt the radio frequency currents around the modulator. This shunting or by-pass condenser is in shunt to the modulator output as is the grid to cathode capacity of the single R. F. stage, again placing a limitation on the range of modulation potentials at which the modulator responds linearly.

An object of my invention is to provide a modulation system of this type wherein the modulator works on the grid circuit of a single ended stage and wherein the capacity loading on the modulator output is small as compared to known systems so that a wide band of signals may be used in the modulator to accomplish linear modulation of the radio frequency grid to thereby linearly modulate the amplitude of the radio frequency being amplified. The band width which may be used in a modulator of this nature is inversely proportional to the capacity at which the modulator works and as a consequence, reducing the capacity load widens the modulation band which may be used.

In like manner, it can be shown that in known plate modulation systems, the modulator output is shunted by the capacity of the radio frequency by-pass condenser shunting the plate source plus the plate tank circuit capacity to ground and plus the capacity in the radio frequency stage between the plate and cathode.

A further object of my invention is to provide a plate modulator wherein the modulator works on the anode of the radio frequency amplifier stage and wherein the connections are such that the capacity in shunt to the modulator tube output is small as compared to known systems so that a wide band of signals may be used in the modulator to accomplish linear modulation of the radio frequency wave energy being amplified.

In describing my invention in detail, reference will be made to the attached drawings wherein:

Fig. 1 illustrates by a simplified wiring diagram the essential features of a known modulation system. This figure is used to illustrate the need of my invention.

Figs. 2 to 5 inclusive illustrate by simple wiring diagram the essential elements and circuit connections of four embodiments of my improved grid modulation system adapted for use with modulation frequencies covering a wide range; while Figs. 2*a* to 5*a* illustrate by simple wiring diagram the essential elements and circuit connections of four embodiments of my improved plate modulation system adapted for use with signals covering a wide frequency band such as television signals.

In Fig. 1, 10 is a radio frequency driver tube having its input electrodes excited by radio frequency currents to be amplitude modulated. The anode of this tube is coupled to a tank circuit 14 tuned to the frequency of the radio frequency potentials being amplified. The circuit 14 being parallel tuned to the input frequency is of high impedance thereto and the voltages set up across the inductance of this circuit are fed into the correspondingly tuned grid circuit 20 connected with the input electrodes of the power amplifier stage 24. These latter connections include a radio frequency by-pass condenser C1 between the low voltage end of radio frequency grid circuit 20 and the cathode of the power amplifier tube 24. Modulation is applied between the grid and cathode of the tube 24. This known circuit is unsuited for use in television or like wide band services because the capacity of C1 plus the capacity between the grid and cathode of tube 24 plus the capacity of the tank circuit 20 with respect to ground is in shunt to the wide band source. As stated above, the width of the band which can be used in this type circuit is inversely proportional to the shunt capacity into which the modulation source works and the shunt capacity is too large to permit satisfactory modulation by a band of frequencies such as found in a video source.

The modulated radio frequency energy appears across the circuit 30 and is fed to a load as desired such as, for example, to another amplifier stage or to an antenna.

An embodiment of my improved modulator wherein the arrangement is such as to eliminate the defects listed above appears in Fig. 2. Insofar as possible, I have used in Fig. 2, numerals and symbols corresponding to those used in Fig. 1. In describing Fig. 2, therefore, only those features which I consider novel and not found in Fig. 1 will be stressed. The anode of the stage 10 is again coupled to a tuned tank circuit 14. The circuit 14 takes the form of a tuned loop coupled to a line L of a length equal to $\lambda/2$ from its open end to the tube electrodes, taking tube and electrode reactance into consideration in arriving at said line dimensions. The loop 14 in the anode circuit of tube 10 is preferably coupled to the line L at a point between the connections thereto of the anode 15 of the modulator tube 16 and the input electrodes of tube 24.

The modulator tube 16 has its anode coupled to its cathode by a resistor R and a source of direct current potential B with the positive terminal of said source grounded and the negative terminal connected to the cathode of tube 16. This permits the anode of tube 16 to run positive with respect to its cathode and yet supplies negative bias as described to the control grid G of the power amplifier tube 24. The control grid of the modulator tube 16 is coupled to a source of signals such as video signals not shown and this coupling includes a blocking capacitor which keeps the bias applied to the control grid through resistor 32 from reaching the modulation source. In practice, a D.-C. restorer tube would be included in the grid circuit of tube 16. The anode of tube 24 is coupled by circuit 30′ to an additional amplifying stage or to an antenna to which the modulated radio frequency output is supplied.

The anode of the modulator tube is connected to a point of substantially zero radio frequency potential on the line L. This point is substantially $\lambda/4$ from the open end of the line and would be at zero potential if there were no losses in the line. In this manner, I have eliminated the radio frequency bypassing capacitor, which is relatively large, used in the modulators known in the art and shown at C1 in Fig. 1 of the drawings. Then the tube 16's output electrodes are not shunted by this capacitor. They are shunted only by the line capacity and the tuning condenser TC in the transmission line which replaces the tuned grid circuit 20 of Fig. 1. The modulator therefore operates linearly over a wider band of modulation potential frequencies than has been possible heretofore.

In the embodiment of Fig. 3, I show an arrangement similar to that of Fig. 2. Fig. 3, however, differs from the embodiment of Fig. 2 in several respects. The resonant line L has been replaced by lumped reactances in a tuned grid circuit 20. This grid circuit 20, however, is not coupled to the cathode by a radio frequency by-passing capacitor. It is coupled to the cathode by an inductance 26 in series with the capacitor C2, the series arrangement of the lumped inductance and capacity being series tuned to the frequency of the oscillatory energy set up in the tank circuit 20 to be modulated. Then the impedance across inductance 26 and condenser C2 is substantially zero with respect to the radio frequency potentials but is of very high impedance with respect to the modulating potentials. Moreover, the capacitor C2 is much smaller than the capacitor C1 so that the modulation amplifier tube output is not shunted by as much capacity as has been the case in the prior art. Thus, again a wider frequency range of modulation can be used for linear modulation in my embodiment of Fig. 3.

Figures 3A, 4, 4A, 5, 5A:
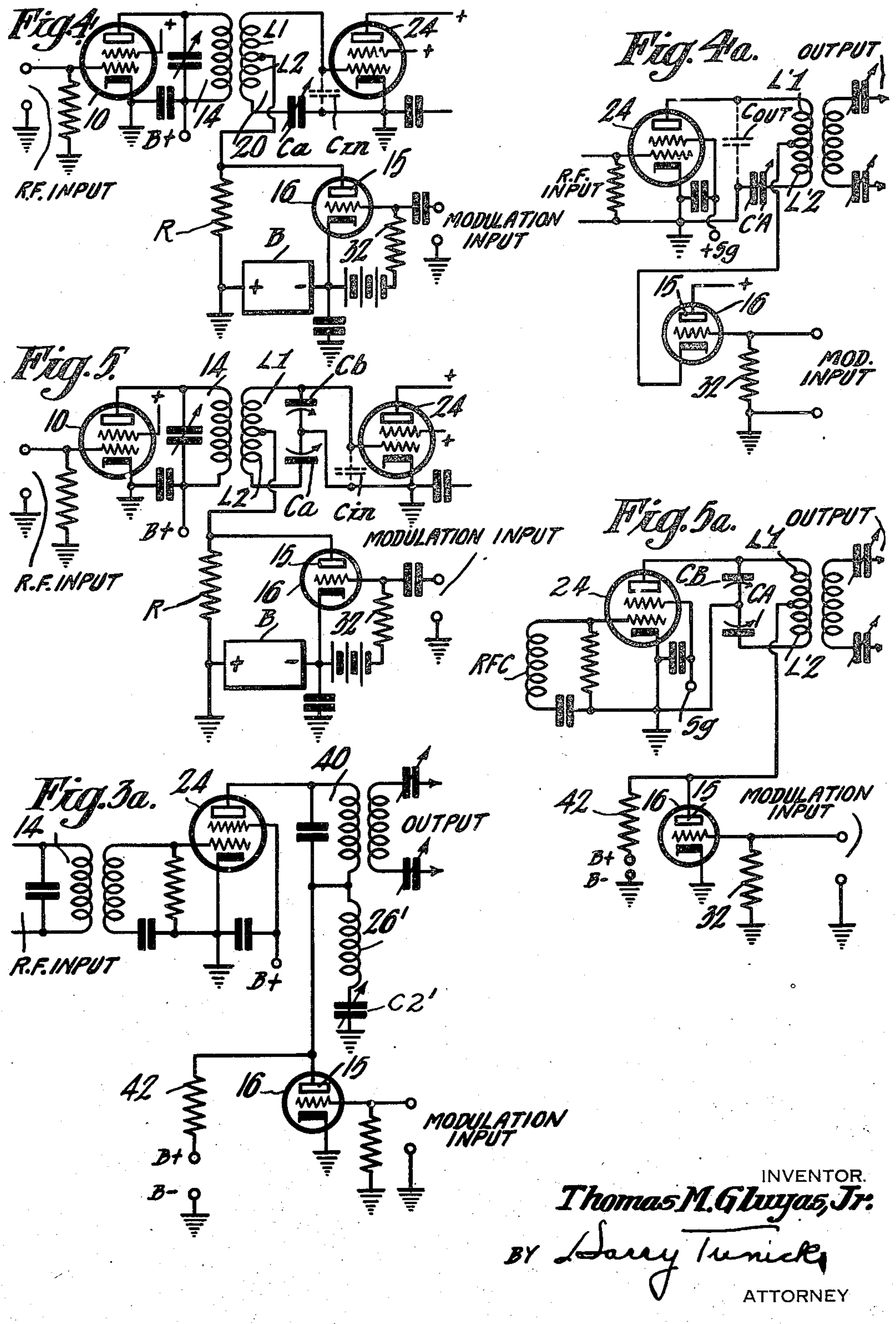

In the arrangement of Fig. 4, the coil of tuned grid circuit 20 and the inductance 26 have been replaced by a single inductance having upper and lower portions L1 and L2. The modulation is applied at the mid point of this coil which is of zero radio frequency. The capacitor *Ca* is set approximately equal in capacity to the capacitor C*in* which represents the input capacity of tube 24. Together, these capacitors are very small as compared to the capacitor C1 of Fig. 1. Condenser C*in* and condenser C*a* in series resonate with L at the exciter frequency, that is, at the frequency of the radio frequency current to be modulated.

The embodiment of Fig. 5 is like the embodiment of Fig. 1 except for the use of a balancing capacitor in shunt to the inductor L1L2, the junction point of which is again connected to the modulator tube output. The video output is shunted by capacitor C*a* and the capacitor C*b* and the capacitor C*in*, in parallel, but they are again smaller than the capacitor C1 of Fig. 1. The circuit L1L2, C*a*, C*b* and C*in* is again tuned to the frequency of the excitation voltage and the video amplifier again couples into the modulated grid circuit at a point of substantially zero radio frequency potential.

In the embodiment of Fig. 2*a*, which is a modification of Fig. 2, plate modulation is carried out. The line L is now connected with the anode of the modulated power amplifier tube 24 and is tuned to resonance at the operating radio frequency by the output capacitance C*out* of tube 24. The video modulator output is coupled to a point on the line about $\lambda/4$ from the open end thereof. This point is of substantially zero radio frequency potential and again the radio frequency by-pass capacitor normally found between the radio frequency output circuit and the cathode of the modulator stage is eliminated so that the modulator output is shunted by a relatively small capacitor and will operate linearly over a wider range. The plate modulator circuit including tube 16 may be of the series type in which case it has its grid excited by the modulation, its anode connected to a source of positive potential and its cathode connected to ground through the internal impedance of the modulated radio frequency amplifier. The line L induces modulated output into a loop circuit L3 which may be coupled to an additional amplifier or to an antenna.

In the embodiment of Fig. 3*a*, which is a modification of the arrangement of Fig. 3, the anode tank circuit 40 is coupled to the cathode of tube 24 or to ground by the inductor 26′ and capacitor C2′, these last two elements serving in a sense the same function the elements 26 and C2 serve in Fig. 3. They are series tuned to the modulated carrier frequency and therefore of zero impedance to the radio frequency voltages. They are, however, of high impedance to the modulation potentials and this capacitor C2′ is of low capacity as compared to by-passing capacitors used heretofore in these connections between the low potential end of the plate circuit and ground or cathode of the power amplifier tube being modulated. The modulation is applied to the junction point between the tank circuit 40 and the inductance 26' and again the modulator tube works into a small capacity so that a wider range of linear modulation can be accomplished. The plate modulator shown here is of the shunt type with the modulator tube anode 15 connected in shunt to a resistor 42 in the anode supply lead to the plate of the tube 24. Modulation is applied to the grid of the modulator tube 16 in a well known manner.

The embodiment illustrated in Fig. 4a is a modification of the arrangement of Fig. 4. In this embodiment, the balanced circuit of Fig. 4 is connected with the anode of the modulated stage. This circuit comprises inductors L'1 and L'2 and capacitor C'A with the modulator tube 16 coupled to the electrical center of the inductor which point is at substantially zero radio frequency potential. The modulator may be of the series type with its cathode coupled to said junction point and its plate to a source of positive potential. The modulator tube is otherwise substantially as illustrated in Fig. 2a and its output is shunted only by the tube 24 electrode capacity and the capacity to ground of the radio frequency circuit, which are relatively small compared to by-pass condensers. The anode of tube 16 is connected to a source of positive potential. Tube 24 is supplied with B+ indirectly since tubes 24 and 16 are essentially in series across the power supply.

Fig. 5a is a modification of the arrangements of Fig. 5 and of Fig. 4a and comprises a balanced circuit including inductors L'1 and L'2 shunted by balanced capacitors CB, CA with the point between CB and CA coupled to the cathode of the radio frequency power amplifier and with the upper end of L'1 connected to the anode of the power amplifier tube. The video modulator tube 16 may be of the shunt type with its anode connected to the point of substantially zero radio frequency potential on the inductance in the anode tank circuit.

In all of the embodiments, I may include, as desired, video peaking reactors and resistors in the modulation circuit. I may also include radio frequency choke coils between the modulator and the modulated amplifier. The purpose and connections of these elements are known in the art and in the sake of simplicity, have been omitted here.

What is claimed is:

1. In a modulation system, an electron discharge device having input and output electrodes connected in an amplifier circuit including a radio frequency circuit, tuned to the frequency of alternating currents of carrier frequency to be modulated, coupled between the output electrodes, a modulator tube having output electrodes including an anode and a cathode and having input electrodes excited by modulation energy, and a connection coupling the anode of the modulator tube to a point of low radio frequency potiential on said tuned circuit.

2. In a modulation system, an electron discharge device having input and output electrodes connected in an amplifier circuit including an open-ended line coupled to certain of said electrodes, apparatus for setting up alternating currents of carrier frequency in said line, a source of modulating potentials, a connection between said sources and said line at a point spaced about λ/4 from the open end thereof, and an output circuit coupled to the output electrodes of said device.

3. A modulator comprising an electron discharge device having input and output electrodes connected in an amplifiers circuit including an open-ended line coupled to the input electrodes, apparatus for setting up alternating currents of carrier frequency in said line, a source of modulating potentials, a connection between said source and said line at a point thereon spaced about λ/4 from the open end of said line, and an output circuit coupled to the output electrodes of said device.

4. In a wide band modulator, an electron discharge device having input and output electrodes connected in an amplifier circuit including an open-ended line coupled to the output electrodes of said device, apparatus for setting up on the input electrodes of said device alternating currents of carrier frequency to be modulated, a source of modulating potentials, connections coupling said source between ground or equivalent potential and a point on said line spaced about λ/4 from the open end thereof, and an output circuit coupled to the output electrodes of said device.

THOMAS M. GLUYAS, Jr.

REFERENCES CITED

The following references are of record in the file of this patent:

UNITED STATES PATENTS

| Number | Name | Date |
|---|---|---|
| 1,932,155 | Culver | Oct. 24, 1933 |
| 1,935,342 | Zeletzky | Nov. 14, 1933 |
| 2,243,504 | Gluyas | May 27, 1941 |
| 2,402,598 | Charchian | June 25, 1946 |